United States Patent [19]

Johnson

[11] 4,019,256
[45] Apr. 26, 1977

[54] GUIDE FOR TOOL OR INSTRUMENT

[76] Inventor: Lance A. Johnson, 774 Edgewood Road, San Mateo, Calif. 94402

[22] Filed: Dec. 19, 1975

[21] Appl. No.: 642,456

[52] U.S. Cl. .................................. 33/79 A; 83/745
[51] Int. Cl.$^2$ ...................................... B43L 13/00
[58] Field of Search ................. 83/745, 743; 33/32, 33/76, 79; 30/372, 371, 293, 294; 308/2 R, 2 A; 74/103, 105, 108, 519, 521

[56] References Cited

UNITED STATES PATENTS

| 36,212 | 8/1962 | Getz | 33/25 R |
| 1,297,788 | 3/1919 | Buck | 33/79 R |
| 2,942,633 | 6/1960 | King | 83/745 |

FOREIGN PATENTS OR APPLICATIONS

| 210,712 | 8/1960 | Austria | 74/103 |
| 731,787 | 2/1943 | Germany | 33/79 A |

Primary Examiner—Harry N. Haroian
Attorney, Agent, or Firm—Julian Caplan

[57] ABSTRACT

A guide to align a cutting or routing tool along a straight line has a stationary support fixed relative to the work and has arm-like linkage between the support and a hand-held tool or instrument. A first end-member of the first parallelogram frame is pivoted to the stationary support, preferably in conjunction with an arcuate angle indicator. Pivoted to this first end-member is a first parallelogram frame consisting of a pair of equal, parallel, arm-members which are pivoted to a pair of tangent identical rollers of a diameter equal to the effective distance between pivot centers of the first end-member. Means, such as bands around the rollers, insure that they revolve in opposite directions the same amount and remain tangent as the first arms move in parallelism. Extending from the center of each roller is one of a second pair of equal, parallel arms of the second frame which are pivoted to a final end-member of the same effective length as the first and the common end-members. The rollers thus constitute an elbow joint for the arm-like device. The final end-member of the second frame is fixed to the tool or to a guide against which the tool or instrument is aligned. One angle of movement of the first arm-members relative to their fixed end results in two angles of movement of the second arm-pair relative to the coupling mechanism. With the first end-member held in constant alignment to the work, movement of the tool or instrument is restricted to a predetermined straight line.

7 Claims, 4 Drawing Figures

GUIDE FOR TOOL OR INSTRUMENT

This invention relates to a new and improved guide for tools or instruments. More particularly, the invention relates to a guide which may be fastened or aligned to a work piece such as a board or fastened to a stationary member or support to which the work piece is aligned. A tool such as a saw, router, etc. is guided for travel in a straight line at any desired angle relative to the work piece.

Among the advantages of the invention are the light weight and ready portability of the device, particularly in that it folds to occupy a small space.

Another advantage of the invention is the flexibility of the guide in use. The arm-like device unfolds only to the extent required by the width of cut. It will readily accept work up to twice its folded dimension. With special fastening at the midpoint in the cut-line, the capacity can be expanded to four times its folded length.

A still further feature of the invention is the uncommon accuracy it affords the user. By combining two separate but reinforcing guidance functions, first, to assure alignment of the tool to the line of cut and, second to restrict the course of tool movement to that same cut path, the invention is self-checking in its function.

Although in its most portable form the device is best adapted to be aligned to the work piece itself, nevertheless, in more industrial quality forms it can also be fastened to the framework of a building or to a permanent stand when this is desirable.

Other objects of the present invention will become apparent upon reading the following specification and referring to the accompanying drawings in which similar characters of reference represent corresponding parts in each of the several views.

Figure 1:
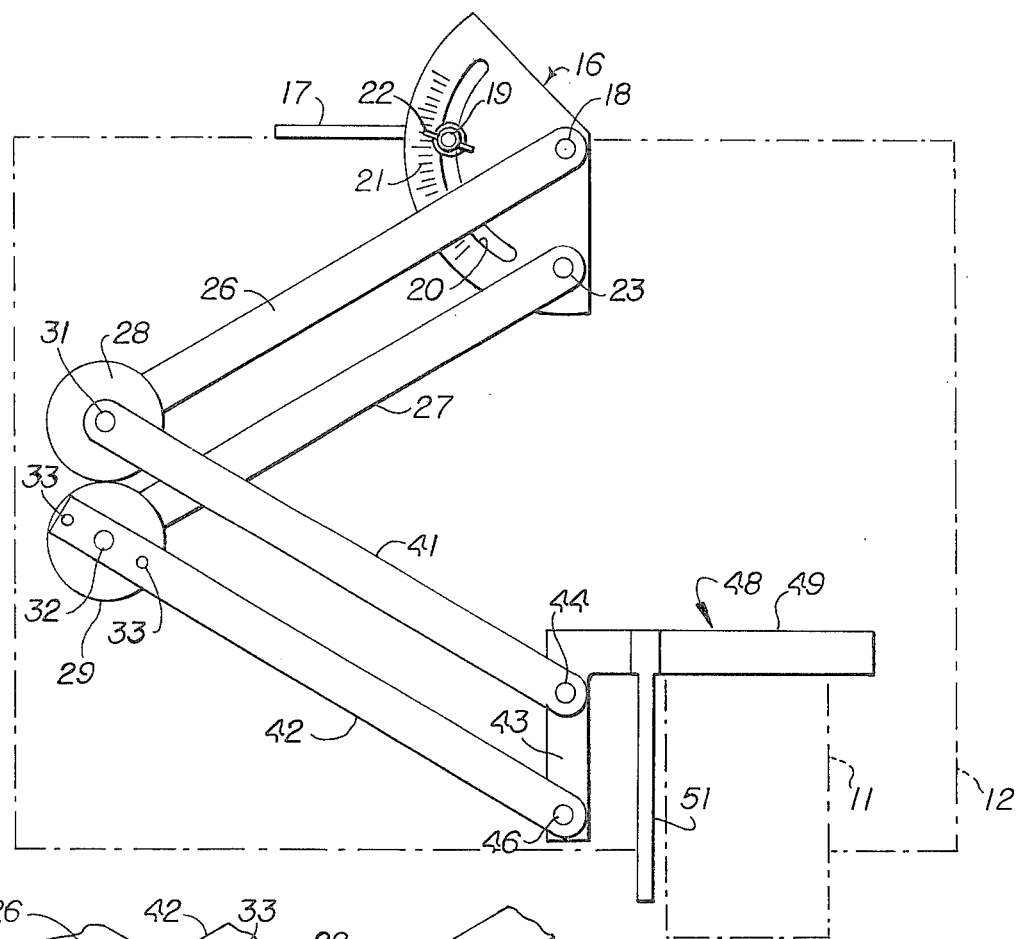
FIG. 1 is a top plan view of the device.

The device hereinafter described in detail is intended for use as a guide for a tool 11 in relationship to a work piece 12. The tool 11 may be a portable saw, router or other power tool or other portable instrument. The work piece 12 is, in the ordinary case, a board.

The angle-selector plate 16 is aligned to the work piece 12 by means of a straight-edge element 17 and fixed thereto by a clamp (not shown) or other means. Alternatively, the angle-selector plate 16 serves as end-member to the first frame. It comprises a plate which fits flush on the top surface of work piece 12 and has a straight-edge 17 which is aligned to one edge of work piece 12. The angle-selector plate 16 is attached to the straight-edge 17 by a first pivot 18. As the angle-selector 16 pivots relative to straight-edge 17, it rides a stationary pin 19 which slides in a slot 20 in the plate. The margin of slot 20 is marked with angle markings 21. Thus the angle-selector plate 16 may pivot around pivot pin 18 in an arc concentric with slot 20. The angle-selector plate 16 is locked at any desired degree setting by a pressure fitting 22 such as a lock-nut, wing-nut, etc., which is threaded to stationary pin 19.

Pivoted to the angle-selector plate 16 are first and second arms 26, 27 which are of equal length. The right-hand end of arm 26 is pivoted by means of pivot 18 to angle-selector plate 16 and also the straight-edge element 17. Arm 27 is pivoted at its right-hand end by pivot 23 to angle-selector plate 16. The left-hand end of arm 26 is fixed to the bottom side of a first roller 28 in line with the pivot center of first axle 31 while the left-hand end of arm 27 is pivoted to second roller 29 by means of second axle 32.

Figure 2:
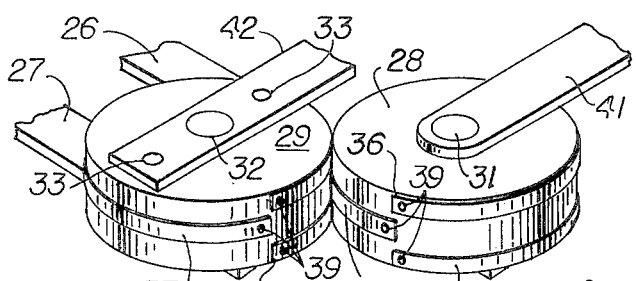
FIG. 2 is a perspective view of the rollers which form the elbow of the device and a portion of the surrounding members.

The rollers 28, 29 are of the same diameter and are tangent to each other and are arranged so that they rotate in opposite directions together. Rotation may be accomplished by several different means. A preferred means herein illustrated is best shown in FIG. 2. First high-tensile tape 36 is one circumference in length and fixed at one end to roller 28 and extends around the roller 28 to the point of tangency with roller 29 and then extends around roller 29. The opposite ends of tape 36 are fixed to roller 28, 29 by attachment means 39. Second tape 37, equal in length to tape 36, is fixed to roller 28 at one end and extends around roller 28 in a direction opposite that in which tape 36 extends to the point of tangency between the two rollers and then extends around roller 29 in a direction opposite the direction in which tape 36 extends. Again, the opposite ends of tape 37 are fixed to rollers 28, 29 by attachment means 39. In order to make the elbow joint more stable a third tape 38, equal in length to tapes 36 and 37, may be used which is parallel to tape 36 and extends in the same direction relative to the two rollers.

Third and fourth arms 41, 42 are of equal length and also of the same length as arms 26, 27. Third arm 41 is pivoted to roller 28 to which first arm 26 is fixed by means of axle 31. The fourth arm 42 is fixed for rotation with roller 29 by pins 33 or other means as might be employed relative to first-arm 26 and roller 28 and hence arm 42 swings only as roller 29 oscillates.

At the other ends of arms 41, 42 is an end-member 43 to which the second ends of arms 41, 42 are pivoted by means of pivots 44, 46, respectively. The distance between the centers of pivots 18, 23 is the same as the distance between the centers of axles 31, 32 and the same as the distance between the centers of pivots 44 and 46. Hence the arms 26, 27 are always parallel to each other and the arms 41, 42 are likewise always parallel to each other. Further, for each degree of movement of the first and second arms 26, 27 relative to angle-selector plate 16 the third and fourth arms 41, 42 turn 2° relative to roller-pair 28, 29 because of the construction of the elbow joint where the rollers 28, 29 are in contact.

The tool locator 48 is fixed to or is integral with the end-member 43. Its construction is subject to considerable variation; but as shown in FIG. 1, it comprises a front guide 49 and a side guide 51 against which the tool 11 abuts and by which, hence, the movement of tool 11 is controlled.

Figure 3:
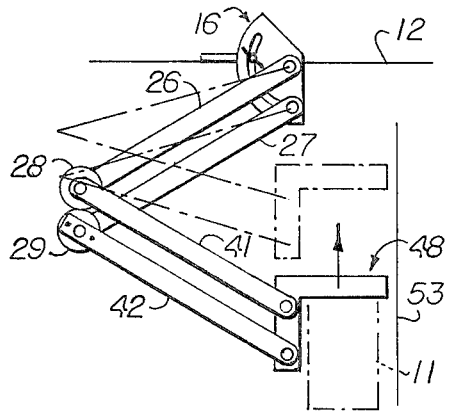
FIG. 3 is a schematic top plan view showing the device adjusted for cutting in a straight line.

Directing attention now to FIG. 3, the angle-selector plate 16 is fixed relative to straight-edge element 17 at a 90° angle. In order to make a cut on the work piece 12, the tool 11 and its locator 48 are in the solid line position of FIG. 3. Pushing on the tool 11 causes the work piece to be cut along a straight line 53 which is perpendicular to the work piece. The dot-and-dash position of locator 48 shows the tool locator at about the midpoint of its cut, and it will be seen that the locator 48 as moved from the solid line to the dotted line position in a straight line causing a straight line cut 53.

Figure 4:
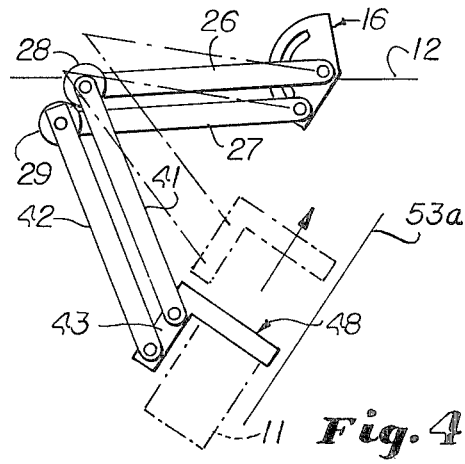
FIG. 4 is a view similar to FIG. 3 with the device adjusted for cutting at an angle.

Directing attention to FIG. 4, the angle-selector plate 16 has been turned 45° from the position of FIG. 3 and clamped in such position, by means of pressure fitting 22. The tool 11 is then directed at a 45° angle relative to the edge of the work piece and the straight-edge element 17, and also relative to the direction of the line 53 of FIG. 3. As the tool is moved from solid line to dotted line position, the line of cut 53a is a straight line at the desired angle relative to the work piece. Thus, the static and dynamic component relationships remain constant relative to the angle-selector plate 16 irrespective of the degree of cut. Only the position of the angle-selector plate 16 relative to the straight-edge element 17 changes with changing cut angles.

What is claimed is:

1. A guide for a tool to be used on a work piece comprising a straight-edge element adapted to be fixed relative to said work piece, an angle-selector plate attached to said element, a first arm, a second arm of equal length to said first arm, first and second pivot means pivotally connecting the first ends of said first and second arms, respectively, to said angle-selector plate, said first and second pivot means being spaced apart a first distance, a first roller mounted in a fixed position on the second end of said first arm, a second roller mounted rotatably on the second end of said second arm, said rollers being of the same diameter, said diameter being equal to said first distance, rotation means to maintain said rollers in tangential contact and to cause said rollers to turn in opposite directions through identical angles, third and fourth arms of equal length and equal to said first and second arms, a first end of said third arm being rotatably connected to said first roller, a first end of said fourth arm being fixed for rotation about the axis of said second roller, and end-member, third and fourth pivot means spaced apart said first distance pivotally connecting the second ends of said third and fourth arms, respectively, to said end-member, and a tool locator fixed relative to said end-member and shaped to receive said tool.

2. A guide according to claim 1 in which said angle-selector plate is pivoted to said straight-edge element, a change of angle of said angle-selector relative to said straight-edge element resulting in an equal change in both the alignment of the tool locator and in the course of movement of said locator.

3. A guide according to claim 1 in which said angle-selector plate is formed with an arcuate slot concentric with said first pivot means, said straight-edge element being pivoted to said plate by said first pivot means, said second pivot means having a pin and pressure means, said pin being slidable in said slot.

4. A guide according to claim 1 in which said plate is formed with a rigid alignment element adapted to be clamped in contact with an edge of said work piece.

5. A guide according to claim 1 in which said rotation means comprises a first inelastic tape having a first end fixed to said first roller, extending partially around said first roller in a first direction to the line of contact between said rollers and thence partially around said second roller in a second direction opposite said first direction and having a second end fixed to said second roller, and a second tape having a first end fixed to said first roller extending partially around said first roller in said second direction to said line of contact and thence partially around said second roller in said first direction and having a second end fixed to said second roller.

6. A guide according to claim 1 in which said rotation means spaces said rollers so that they are in line contact and so that when one said roller turns the other said roller turns in the opposite direction.

7. A guide for a tool comprising
a fixed alignment member,
a first arm linkage pivoted at a first end to said alignment member,
a second arm linkage,
a locator pivoted to a first end of said second arm linkage,
and means interconnecting a second end of said first arm linkage and a second end of said second arm linkage for relative movement of said alignment member and said locator over an amplitude approximately 90° of movement, said means being related to said first and second arm linkages so that for each one degree of rotation of said first arm linkage relative to said fixed alignment member there is a two degree movement of said second arm linkage relative to the position of said second arm linkage prior to such rotation of said first arm linkage and there is a one degree rotation of said locator relative to the position of said locator prior to such rotation of said first arm linkage.

* * * * *